United States Patent [19]
Beagley et al.

[11] Patent Number: 5,722,896
[45] Date of Patent: Mar. 3, 1998

[54] BALANCED PROPELLER SHAFT USING A WEIGHT ANCHOR

[75] Inventors: Russell James Beagley; John Alan Smith, both of Melbourne, Australia

[73] Assignee: Unidrive Pty. Ltd., New South Wales, Australia

[21] Appl. No.: 886,443

[22] Filed: Jul. 1, 1997

Related U.S. Application Data

[63] Continuation of Ser. No. 601,829, Feb. 15, 1996, abandoned, which is a continuation of Ser. No. 139,794, Oct. 22, 1993, abandoned.

[30] Foreign Application Priority Data

Oct. 28, 1992 [AU] Australia ................... PL5547

[51] Int. Cl.$^6$ ........................................ F16C 3/00
[52] U.S. Cl. ........................................ 464/180; 74/573 R
[58] Field of Search ........................ 464/180, 183; 219/56, 93; 73/455, 456; 74/573 R

[56] References Cited

U.S. PATENT DOCUMENTS

| | | | |
|---|---|---|---|
| 2,299,001 | 10/1942 | Anderson | 219/93 |
| 3,114,031 | 12/1963 | Dash . | |
| 3,340,379 | 9/1967 | Sweeney | 219/93 |
| 3,688,080 | 8/1972 | Cartwright et al. . | |
| 4,887,989 | 12/1989 | Kerecman | 464/180 |
| 4,895,551 | 1/1990 | Fritz | 464/180 |
| 5,461,768 | 10/1995 | Matsumoto et al. . | |

FOREIGN PATENT DOCUMENTS

| | | | |
|---|---|---|---|
| 520719 | 12/1992 | European Pat. Off. . | |
| 1138707 | 1/1962 | Germany | 219/93 |
| 3140368 | 1/1983 | Germany | 464/180 |
| 465259 | 5/1937 | United Kingdom . | |
| 603784 | 6/1948 | United Kingdom . | |
| 1417266 | 12/1975 | United Kingdom . | |
| 2090942 | 7/1982 | United Kingdom . | |
| 2147388 | 5/1985 | United Kingdom . | |

OTHER PUBLICATIONS

Metals Handbook, 9$^{th}$ edition, vol. 6, pp. 729–738, (1983).

Primary Examiner—Eileen A. Dunn
Attorney, Agent, or Firm—Oliff & Berridge, P.L.C.

[57] ABSTRACT

A propeller shaft provided including, a tubular body (1) and a balance weight (5) attached to the body (1). The propeller shaft is characterised in that a stud (4) is welded to a cylindrical outer surface of the body (1) so as to project outwardly from that surface. The weight (5) has a hole (8) therethrough and located over the stud (4) so that the stud (4) extends into the hole (8). A terminal end portion (10) of the stud (4) contacts the weight (5) so as to thereby prevent separation of the weight (5) from the stud (4). A method for attaching a balance weight to a propeller shaft is also provided.

9 Claims, 2 Drawing Sheets

BALANCED PROPELLER SHAFT USING A WEIGHT ANCHOR

This is a Continuation of application Ser. No. 08/601,829 filed Feb. 15, 1996, now abandoned, which in turn is a Continuation of application Ser. No. 08/139,794 filed Oct. 22, 1993, now abandoned.

BACKGROUND OF THE INVENTION

1. Field of the Invention

This invention relates to propeller shafts and is particularly although not exclusively concerned with such shafts as used to transmit drive from the engine of a vehicle to the road engaging wheels of that vehicle. It will be convenient to hereinafter describe the invention with particular reference to vehicle propeller shafts, but it is to be understood that the invention has other applications.

2. Background of the Related Art

Vehicle propeller shafts need to be balanced in order to avoid development of annoying and possibly harmful vibration when the shaft is rotating. Attachment of balance weights is therefore a standard procedure in the manufacture of propeller shafts, and that procedure needs to be such as to meet both quality and manufacturing cost requirements. As to quality, the balance weights should be attached in a secure manner and also in a manner which does not disturb the integrity of the shaft. As to manufacturing cost, the attachment method should be relatively simple and accurate, and should not require excessive time to complete.

The problems associated with attachment of balance weights to propeller shafts have become exacerbated by the increasing popularity of shafts having a tubular body. Those problems are particularly pronounced in the case of such shafts which employ the use of an aluminium tube for the body. The invention will be hereinafter described with reference to aluminium tube propeller shafts, but it is to be understood that the invention is also applicable to shafts having a tubular body of steel or other appropriate metal.

It is generally preferred to use steel balance weights because of their favourable size to weight ratio. Attachment of such weights to aluminium tube is currently achieved in a number of ways, none of which is entirely satisfactory.

SUMMARY OF THE INVENTION

One current method involves the use of adhesive to secure the balance weight to the tube. That method requires the tube and the weight to be free of contamination which might disturb the security of the attachment, and chemical cleaning is generally necessary for that purpose. Also, there is a significant time lapse (e.g., approximately 24 hours) after application of the adhesive before it achieves full strength. The process is therefore time consuming and requires adherence to high standards of cleanliness if effective results are to be achieved.

According to another prior method, the weights are attached to the tube by puddle welding. That method may be acceptable if the tube wall is relatively thick—e.g., 3 mm or more—but many propeller shafts have a lesser wall thickness. Puddle welding can effect the structure of the tube wall to the extent that the risk of stress fatigue is significantly increased.

Another prior method involves spot or projection welding one or more weights to a steel sleeve which is secured around the outside of the propeller shaft tube, usually at the end of the tube which fits over the universal joint yoke. That method has the disadvantage of requiring an additional and relatively large component to be secured to the shaft. It also requires the application of suitable corrosion protection after completion of the securing operation.

It is an object of the present invention to provide an improved method for attaching a balance weight to a tube, and particularly the tubular body of a propeller shaft. It is a further object of the invention that such a method be convenient to carry out and is effective in providing a secure attachment. It is another object of the invention to provide a balance weight attached in an improved manner. It is still another object of the invention to provide an improved anchor for the balance weight of a propeller shaft.

In accordance with one aspect of the present invention, there is provided a method of attaching a balance weight to a propeller shaft, including the steps of securing an anchoring element to a surface of the shaft so that said element projects from said surface, placing a balance weight on said element, and securing said balance weight to said element.

The anchoring element can be secured to the shaft in any suitable fashion, but in a preferred method it is secured by a stud welding technique.

It is further preferred that attachment of a balance weight to the anchoring element may be effected by providing the weight with an opening which receives the anchoring element, and distorting the terminal outer end of the anchoring element after the weight has been located over that element in such a way that removal of the weight from anchoring element is resisted. Heat and pressure might be employed for that distortion operation.

In accordance with a further aspect of the present invention, there is provided a propeller shaft including, a tubular body, a stud welded to a cylindrical outer surface of said body and projecting outwardly from that surface, a balance weight having a hole therethrough located over said stud so that said stud extends into said hole, and a terminal end portion of said stud coacting with said weight so as to thereby prevent separation of said weight from said stud.

In accordance with still another aspect of the present invention there is provided a propeller shaft balance weight anchor including, a cylindrical body, and a welding pip projecting axially from an inner end of said body, said pip having a transverse cross-sectional size substantially less than the transverse cross-sectional size of said body.

It is preferred, that when the body is being secured to a shaft tube, the pip is engaged against the outer surface of the propeller shaft and an electrical current is passed through the body so that the pip melts and fuses with the surface of the propeller shaft. Capacitance discharge stud welding or any other suitable resistance welding technique may be used for that purpose.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

DESCRIPTION OF THE DRAWINGS

These and other aspects and advantages of the invention will become apparent from the following detailed description of the preferred embodiment when taken in conjunction with the accompanying drawings, in which.

DESCRIPTION OF PREFERRED EMBODIMENT

Figure 1:
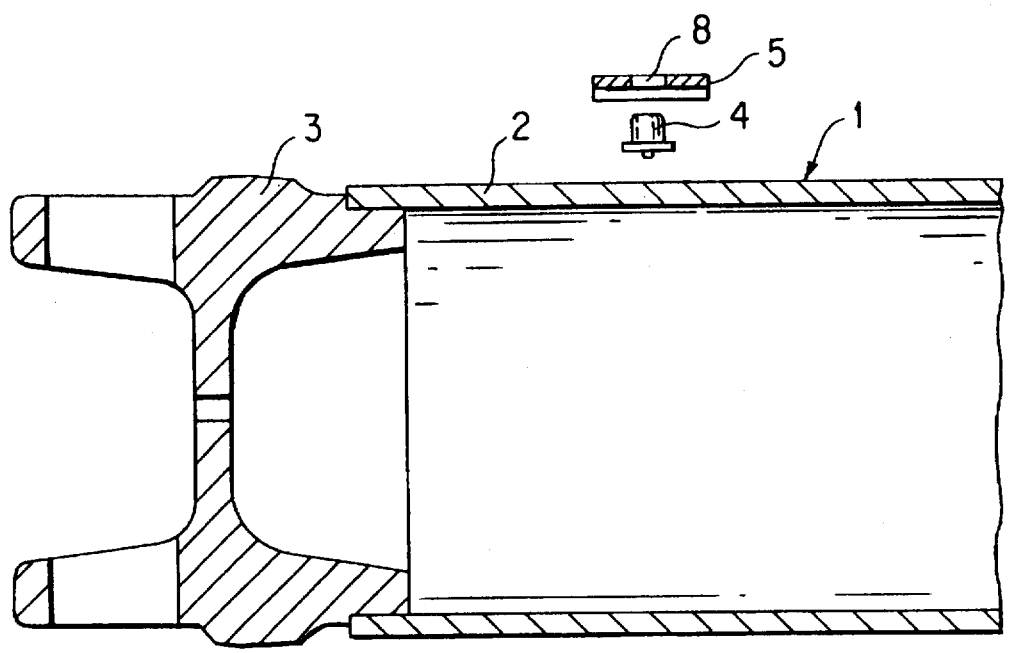
FIG. 1 is a semi-diagrammatic view of a propeller shaft having a balance weight attached.

FIG. 1 illustrates in semi-diagrammatic form an end portion 2 of a tubular propeller shaft 1 attached to the yoke 3 of a typical universal joint. An anchoring element in the form of a small stud 4 is adapted to be secured to the end portion 2 as hereinafter described, and that stud 4 is adapted to receive and hold a balance weight 5 in a manner also hereinafter described.

Figure 2:
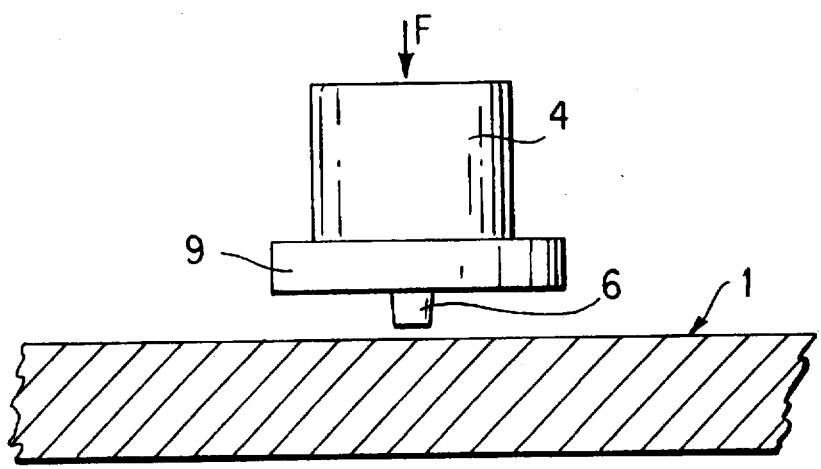
FIG. 2 shows a preferred form of an anchoring element according to the invention.

The anchoring element can be of any suitable form and composed of any suitable material according to the circumstances of use. It is generally preferred however, that the anchoring element be arranged so that it projects outwardly from the outer surface of the shaft 1 when secured to that shaft, so as to be thereby cooperable with a balance weight. In the particular example shown in FIGS. 2 to 4 of the drawings, the anchoring element is a small cylindrical stud 4, which is initially formed to have a small pip 6 projecting axially from one end as shown in FIG. 2. Assuming the tubular body of the shaft 1 is of aluminium or an aluminium alloy, the stud 4 may be also composed of aluminium or an aluminium alloy, but that is not essential.

Known techniques can be adopted to select a position on the shaft 1 at which a balance weight is required. The stud 4 is then located at that position with the pip 6 engaging the outer surface of the shaft 1 as shown in FIG. 2. A known stud welding technique can be then employed to cause passage of an electric current through the stud 4. The pip 6 is thereby caused to melt and is fused into the body of the shaft 1 as shown diagrammatically by the zone 7 in FIGS. 3 and 4. An axial force F may be applied to the stud 4 during the welding process, but that need not be high. It will be appreciated that other suitable methods may be adopted for securing the stud 4 to the shaft 1.

Figure 5:
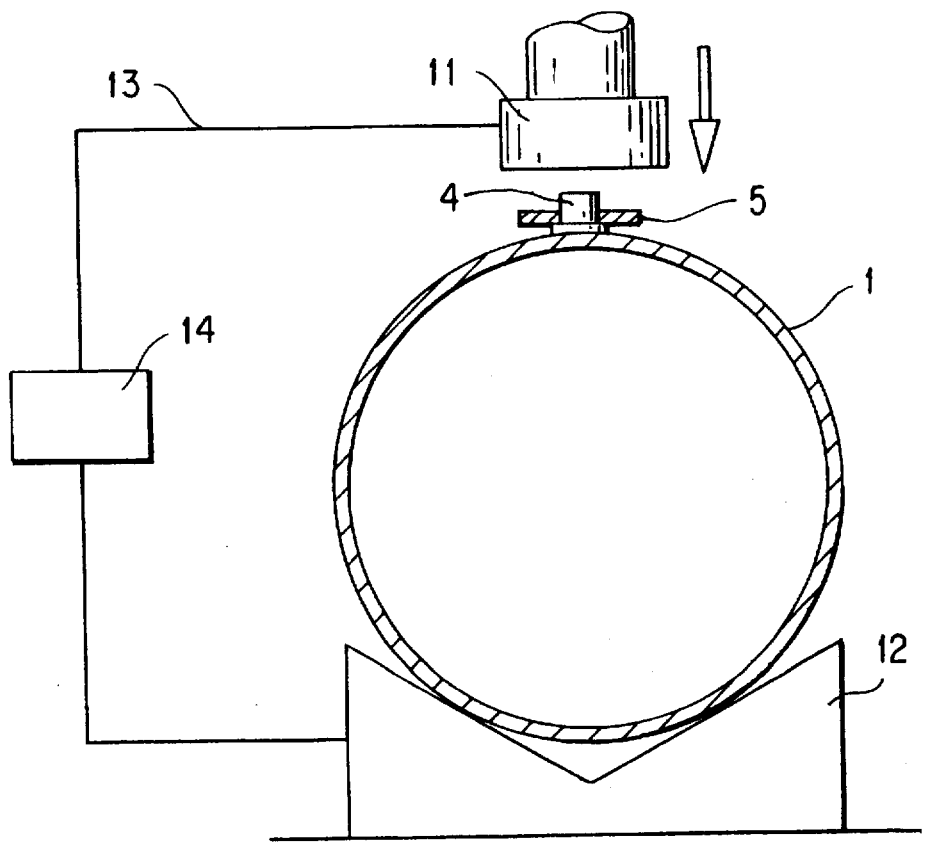
FIG. 5 is a diagrammatic view of a propeller shaft having a balance weight attached.
Figure 3:
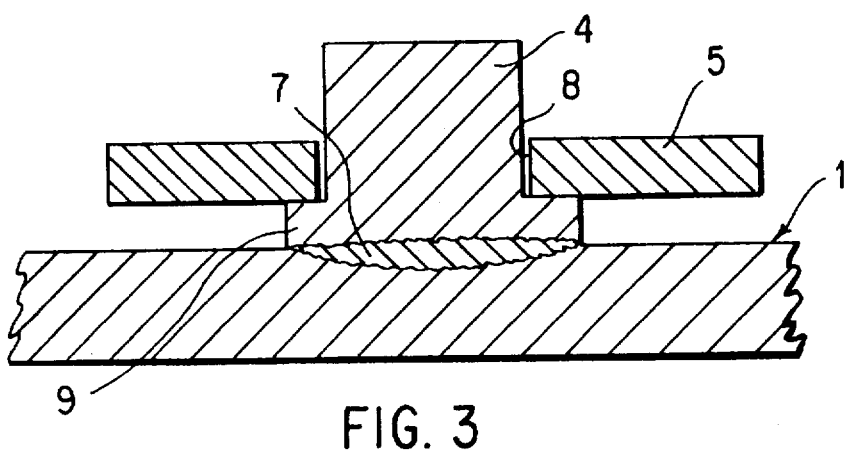
FIG. 3 shows an intermediate step in securing an anchoring element to a propeller shaft.
Figure 4:
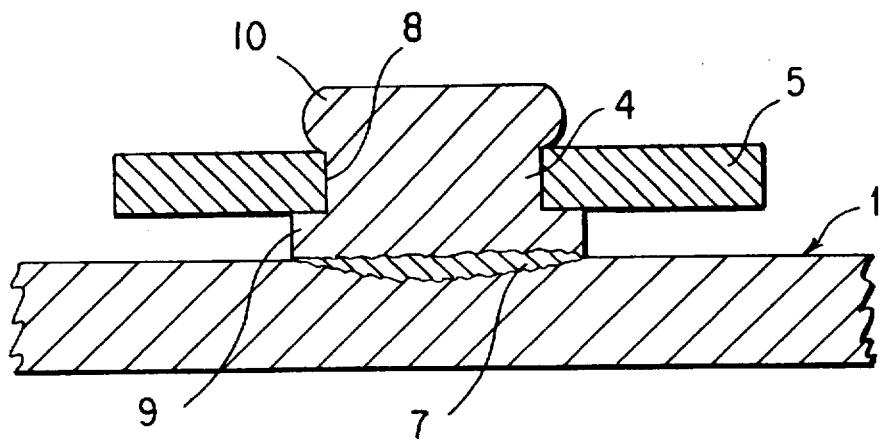
FIG. 4 shows a balance weight secured to a propeller shaft.

Any appropriate method may be used to attach the weight 5 to the stud 4 and thereby effect attachment of the weight to the shaft 1. In the particular example shown, the weight 5 is provided with a hole 8 which is able to receive the stud 4 as shown in FIGS. 3 to 5. The stud 4 may be a loose or an interference fit within the hole 8, although it is preferred to provide a neat sliding fit. The stud 4 may also be provided with a flange 9 against which the weight 5 may be located.

It is usually preferred to positively retain the weight 5 against separation from the stud 4, and any suitable means can be used for that purpose. In one arrangement as illustrated diagrammatically in FIG. 4 of the drawings, the outer terminal end of the stud is distorted so as to spread and create an enlargement 10 which cannot pass through the hole 8. The weight 5 is thereby held against separation from the stud 4.

Distortion of the stud end can be achieved in any suitable fashion. According to the arrangement shown diagrammatically in FIG. 5, such distortion is achieved by passing electric current through the stud 4 so as to heat it to a plastic state, and simultaneously applying endwise pressure to the stud 4. A resistance welding technique can be used for that purpose. In the arrangement shown in FIG. 5, contacts 11 and 12 are connected into an electric circuit 13 which includes a suitable energy source 14, and the circuit is completed when the contact 11 engages the stud 4. The stud 4 is thereby heated to a plastic state, and pressure applied through the contact 11 causes the end of the stud 4 to spread as shown in FIG. 4.

An advantage of the method described in relation to FIG. 5 is that the pressure applied to the stud 4 need not be great, and consequently distortion of the tubular body of the shaft 1 is unlikely.

Adoption of attaching means according to the invention has several benefits. By way of example, the balance weight can be supplied with a suitable corrosion resistant coating, and that can be very important if the weight is made of a metal different to that of the anchoring stud and/or the tubular body of the shaft. The integrity of the corrosion resistant coating is unlikely to be damaged by the relatively mild method utilised for attaching the weight to the anchoring stud. A further benefit is that the attaching means can be conveniently adopted in a machine controlled manufacturing process. Still further, the integrity and strength of the tubular body of the propeller shaft are not significantly disturbed by the method whereby the anchoring stud is secured to the shaft.

Various alterations, modifications and/or additions may be introduced into the constructions and arrangements of parts previously described without departing from the spirit or ambit of the invention as defined by the appended claims.

Having now described our invention, what we claim as new and desire to secure by Letters Patent is:

1. A propeller shaft, comprising:

a shaft body;

a balance weight formed separately from said shaft body and having an aperture therethrough;

a metallic rigid anchoring element formed separately from said shaft body and said balance weight;

fixing means securing said rigid anchoring element to an outer surface of said shaft body so that said rigid anchoring element projects outwardly from said outer surface at a preselected balance weight location on said outer surface, the rigidity of said rigid anchoring element combined with the operation of said fixing means enabling said rigid anchoring element to function as fixed locating means for receiving said balance weight and holding said balance weight in said preselected balance weight location, said balance weight being positioned on said rigid anchoring element by engagement of said fixed rigid anchoring element within said aperture of said balance weight; and securing means formed by a distorted part of said rigid anchoring element in which said part engages said balance weight and thereby prevents removal of said balance weight from said rigid anchoring element.

2. The propeller shaft according to claim 1, wherein said shaft body is a tubular body and said outer surface is an outer cylindrical surface of that body.

3. The propeller shaft according to claim 2, wherein said body is formed of aluminium or an aluminium alloy.

4. The propeller shaft according to claim 1, said rigid anchoring element having a cylindrical body and having a welding pip projecting outwardly from one end of said cylindrical body, said fixing means being provided by the melted form of said welding pip fused to said outer surface of the propeller shaft, wherein said distorted part of said rigid anchoring element is an end of said cylindrical body opposite to said one end of said cylindrical body.

5. The propeller shaft according to claim 1, wherein said balance weight is positioned on said rigid anchoring element by sliding engagement of said fixed rigid anchoring element within, said aperture of said balance weight.

6. The propeller shaft according to claim 1, wherein the distorted part of said rigid anchoring element is at a position remote from said outer surface of said shaft body.

7. The propeller shaft according to claim 1, wherein said distorted part of said rigid anchoring element is a hot forged distortion.

8. A propeller shaft, comprising:

a shaft body;

a balance weight formed separately from said shaft body and having an aperture therethrough;

a rigid anchoring element formed separately from said shaft body and said balance weight;

fixing means securing said rigid anchoring element to an outer surface of said shaft body so that said rigid anchoring element projects outwardly from said outer surface at a preselected balance weight location on said outer surface, the rigidity of said rigid anchoring element combined with the operation of said fixing means enabling said rigid anchoring element to function as fixed locating means for receiving said balance weight and holding said balance weight in said preselected balance weight location; and securing means formed by a distorted part of said rigid anchoring element remote from said outer surface of said shaft body, said balance weight being engaged on said rigid anchoring element by engagement of said rigid anchoring element within said aperture of said balance weight so that said securing means engages said balance weight and prevents removal of said balance weight from said rigid anchoring element.

9. A propeller shaft comprising:

a shaft body;

a balance weight formed separately from said shaft body and having an aperture therethrough;

a rigid anchoring element formed separately from both said shaft body and said balance weight;

fixing means securing said rigid anchoring element to an outer surface of said shaft body so that said rigid anchoring element projects outwardly from said outer surface at a preselected balance weight location on said outer surface, the rigidity of said rigid anchoring element combined with the operation of said fixing means enabling said rigid anchoring element to function as fixed locating means for receiving said balance weight and holding said balance weight in said preselected balance weight location; and securing means formed by a distorted part of said rigid anchoring element remote from said outer surface of said shaft body, said balance weight being engaged on said rigid anchoring element by engagement of said rigid anchoring element within said aperture of said balance weight, said aperture being smaller than the distorted part of said rigid anchoring element and said securing means engaging said balance weight to prevent removal of said balance weight from said rigid anchoring element.

* * * * *